United States Patent [19]

Byrne et al.

[11] 4,012,202

[45] Mar. 15, 1977

[54] PYROSCRUBBER

[75] Inventors: Henry James Byrne, Two Mountains; Raman Radha Sood; David Michael Stokes, both of Arvida, all of Canada

[73] Assignee: Alcan Research and Development Limited, Montreal, Canada

[22] Filed: Apr. 2, 1975

[21] Appl. No.: 564,531

[30] Foreign Application Priority Data

Apr. 3, 1974 United Kingdom ............ 14886/74

[52] U.S. Cl. .............................. 23/277 C; 23/262; 110/8 R; 110/8 A; 202/241; 202/228; 202/100; 202/95; 201/27; 201/25; 201/2.5; 55/DIG. 30

[51] Int. Cl.² ........................ C10B 1/10; F23G 7/06

[58] Field of Search .......... 23/277 C, 262; 110/8 R, 110/8 A; 202/24, 228, 227, 230, 100, 262, 131, 95; 201/27, 25, 2.5

[56] References Cited

UNITED STATES PATENTS

| | | | |
|---|---|---|---|
| 1,993,199 | 3/1935 | Wisner | 202/230 X |
| 2,151,849 | 3/1939 | Hardy et al. | 202/131 |
| 3,064,593 | 11/1962 | Burk et al. | 110/8 R |
| 3,607,118 | 9/1971 | Johnson | 23/277 C |
| 3,759,795 | 9/1973 | Oliver et al. | 201/27 X |
| 3,795,987 | 3/1974 | Kemmetmueller | 34/168 |

*Primary Examiner*—James H. Tayman, Jr.
*Attorney, Agent, or Firm*—Cooper, Dunham, Clark, Griffin & Moran

[57] ABSTRACT

A pyroscrubber for combustion of large carbon particles in a stream of waste gas, particularly the waste gas from a coke calcination furnace comprises a generally U-shaped combustion chamber having a first passage arranged parallel with (preferably above) a second passage, so that there is a reversal in gas flow direction between the two passages. The combustion chamber has an exhaust gas inlet and an array of air inlets at the inlet end of the first passage. A gas outlet preferably leads laterally out of the side of the structure at the outlet end of the second passage to secure an abrupt change in the direction of gas flow.

4 Claims, 5 Drawing Figures

PYROSCRUBBER

The present invention relates to the removal of combustible solid particles carried in exhaust gases from coke calcination kilns and to apparatus for such purpose. A particular feature of the invention is a "pyroscrubber" in which such solids are removed by combustion during passage therethrough.

In coke calcination finely ground coke, obtained by carbonisation of coal or oil, is passed counter-current through a rotary calciner or fluidised-bed calciner with the object of distilling off the volatile content and of rendering the coke particles more dense to permit production of satisfactory carbon electrodes therefrom. Large volumes of hot gases are passed through the calciner to drive off the contained volatiles from the body of carbonaceous material passing through the calciner.

It is well known to provide secondary burners for use in flues for the combustion of smoke particles in the flue gases emitted from furnaces. The problem to be solved in removal of solids from the exhaust gases of coke calcination kilns is of quite a different order, since the carbon particles may be both larger (up to 1 mm) and denser (therefore more difficult to oxidise) than the very fine solid or liquid particles present as smoke in flue gases.

It is the function of the pyroscrubber of the present invention to oxidise the carbonaceous content, including hydrocarbon volatiles, of the exhaust gas of the calcination kiln flue gas, so as to leave no more than small traces of volatiles or solid carbon in the flue gas finally discharged to atmosphere. Pyroscrubbers of different design have already been proposed and constructed for performing the same function on the exhaust gas from a coke calcination kiln. Known pyroscrubbers have comprised a long, straight combustion chamber of large cross section to permit passage of the large volume of gas. They rely on normal flue draught for drawing in air at various locations in the combustion chamber. Supplementary air is drawn into the combustion chamber at a substantial distance from the inlet end of the combustion chamber with the result that there is delay before thorough mixing of the air and the waste gas occurs. It follows that the dimensions of the combustion chamber of known pyroscrubbers are rather large.

It is an object of the present invention to provide an improved pyroscrubber which may be more compact and economical in construction than those heretofore employed.

In accordance with the invention there is provided a pyroscrubber including a chamber with an inlet for gas containing combustible solids which are to be removed by combustion and an outlet for scrubbed gas, the chamber having first and second passages defining a substantially U-shaped gas flow path, with the inlet and the outlet being respectively at the free ends of the first and second passages. Preferably the first passage, having the inlet, is arranged above the second passage.

It will be understood that the temperature of the gas must be high during its passage through the pyroscrubber in order to effect oxidation of the entrained, relatively inert calcined coke particles carried thereby and in consequence the combustion chamber walls are lined with refractory blocks. As is usual these are most preferably supported by structural steelwork. Where the first passage of the combustion chamber is arranged over the second passage much of the steelwork can be used for support of the refractory linings of both passages.

Where an incandescent carbon particle is carried in an oxygen-containing gas stream, the products of its own combustion tend to increase in its immediate surroundings and thus reduce its rate of oxidation. This can be counter-acted by increase of turbulence in the gas stream and by increasing "slip" between the particles and the gas. Where the gas moves at a different speed from the entrained particles, there is "slip" or relative movement of the particles to the gas.

The pyroscrubber construction of the present invention has the advantage that the gases passing through the combustion chamber turn through 180° in passing from the first passage to the second passage, leading to an increase in turbulence in the gas stream and in the slip between the gas and the entrained particles. This leads to increased speed of combustion by separating the coke particles from their own combustion products.

It is preferred for the outlet from the combustion chamber to be in the side of the structure so as to turn the outgoing gas flow through a right angle to again increase slip in the zone immediately preceding as well as succeeding the corner. Thus, if the outlet is at one side of the second passage the gas in traversing the combustion chamber will turn through 180° between the first passage and second passage and will further turn through 90° to pass from the second passage to the outlet. These very sharp reversals in gas flow direction promote slip in a substantial zone both before and after the corner or bend in the combustion chamber.

Where the pyroscrubber of the invention is associated with a coke calcining kiln, it is advantageous to provide the first passage having the gas inlet, above the second passage, as the kiln will generally have an exhaust gas outlet (and coke inlet) considerably above ground level. In addition, where the outlet from the pyroscrubber leads directly to the stack, it is advantageous to have the outlet from the pyroscrubber at or close to ground level so as to make full use of the height of the stack.

Preferably, the pyroscrubber of the invention includes means for supplying air under pressure adjacent the gas inlet so as to promote turbulence and to ensure that air is thoroughly mixed with the gas as soon as possible after entry of the gas into the combustion chamber. This shortens the dwell time required for combustion of solids, thus allowing the size of the combustion chamber to be reduced. With such apparatus, the entire chamber can be efficiently used for combustion of coke particles and volatiles, and good mixing between the air and exhaust gas can be obtained.

In addition to the air supply adjacent the gas inlet, a further air supply means to the chamber can be located adjacent the outlet, to regulate the flue draught and to lower the temperature of the scrubbed exhaust gases. In this application of the invention to scrubbing gas from a calcining kiln, this additional air supply means may be used to regulate, to some extent, the draught through both the pyroscrubber and the kiln. This regulation can be effected without altering the pyroscrubber combustion conditions. When the pyroscrubber outlet leads directly into a stack the further air supply means may be in the chamber near the bottom of the stack. This air will cool the exhaust gases, but generally not in a manner detrimental to combustion, since combustion will usually be complete before this additional air is added. The outlet may, of course, lead to heat recovery means, such as a waste heat boiler and/or to other gas scrubbing apparatus, for example, for removal of non-carbonaceous fly ash.

In order that the invention may be more clearly understood, the following description is given, by way of example, with reference to the accompanying drawings, in which.

Figure 1:
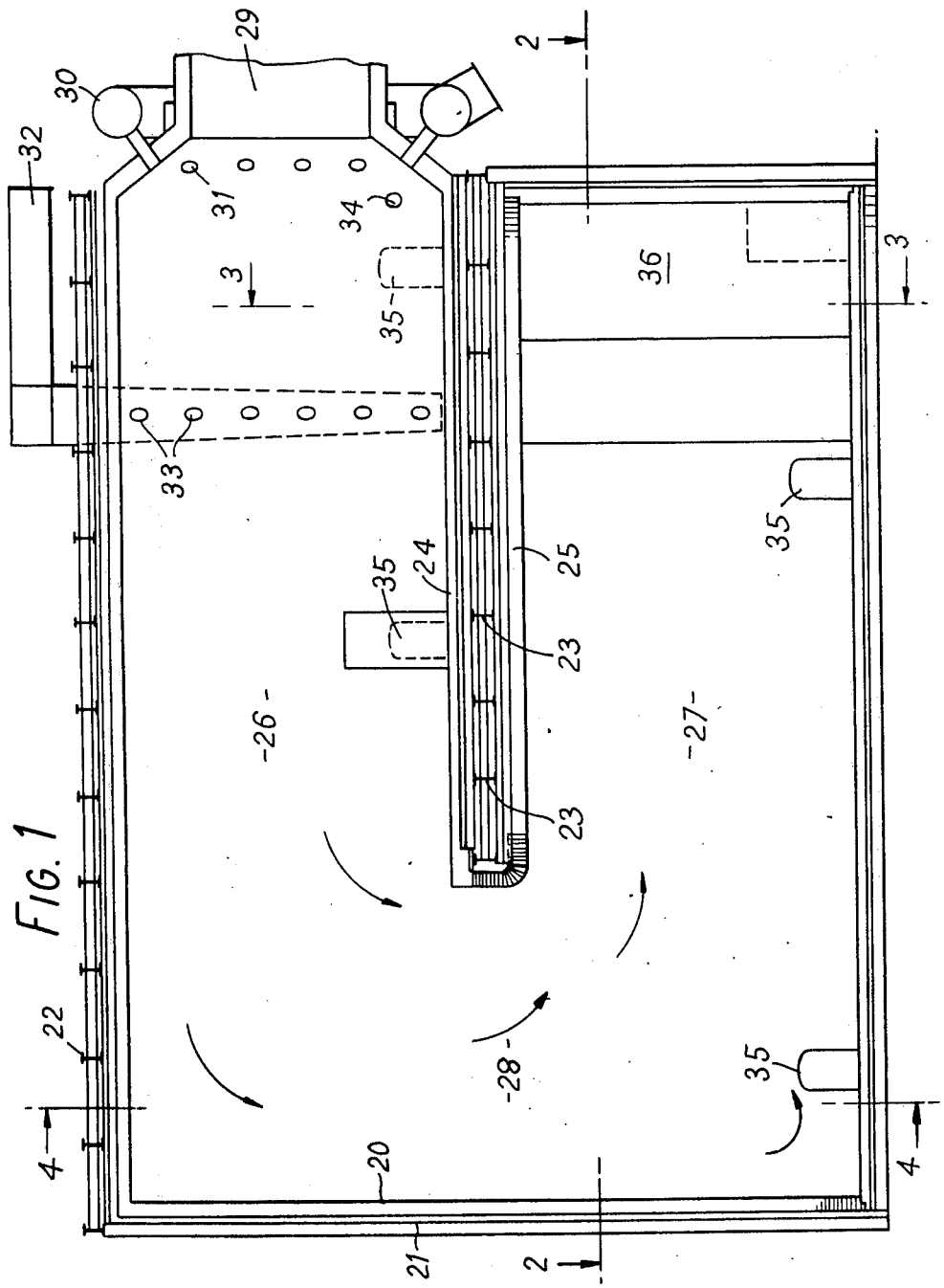
FIG. 1 is a vertical section of one embodiment of apparatus according to the invention.

The calcination operation is carried out in known manner in an inclined rotary kiln 1, in which green coke is fed at feed station 2 near the upper end. Air for combustion of volatiles is supplied at one or more points 3 and burners (not shown) are located at the bottom end of the furnace to provide heat at start-up and to provide supplementary heat when necessary. Calcined coke issues from the lower end of the kiln and exhaust gases, containing carbon particles, unburnt hydrocarbon vapours and carbon monoxide issue from the upper end of the kiln at high temperature.

Coke, issuing from the kiln 1, enters a rotary cooler 5, typically at a temperature of 1200° C. The coke is cooled by spraying water to quench the coke. The resultant steam, together with air drawn in through the inlet end of the cooler is drawn off through a surrounding manifold by means of a suction fan 6. The cooler exhaust gas, typically at 250° C is drawn through a cyclone 7, where large particles are removed and the air/water vapour mixture, containing a proportion of entrained coke fines, is forwarded to the pyroscrubber 8.

The pyroscrubber 8, the operation of which will be described separately below thus receives the exhaust gases from the kiln typically between 600° and 1000° C and having a substantial content of unburnt volatiles and entrained solid carbon particles and somewhat dusty air/water vapour mixture at about 250° C derived from the coke cooler 5. The solids and volatiles of these two inputs are burnt during passage through the pyroscrubber by means of further air injected by fan 9 and the exhaust from the pyroscrubber, now essentially free from abrasive coke particles, is passed at a high temperature, typically 1200° C, to a waste heat boiler 10 in which the exhaust gas temperature is reduced to say 250° C. The waste heat boiler is a heat exchanger for recovery of the thermal content of the gas and may be replaced by other forms of heat exchanger. Gas is drawn through boiler 10 by fan 11 and forwarded to a conventional wet scrubber 12, from which it passes to a stack 14. The waste water from scrubber 12 may be forwarded via pipe 15 (with added make-up water via pipe 16, if required) to coke cooler 5 for quench purposes. Alternatively, some or all of the waste water may be discarded to remove soluble acidic gases such as sulpur dioxide from the system.

Although the above described arrangement may be employed with other forms of pyroscrubber than that hereinafter described it is particularly convenient in association with the pyroscrubber of the invention.

In the above described arrangement the draught through the pyroscrubber 8 is controlled by fan 11, which operates on the cooled exhaust gases from the waste heat boiler 10.

In other cases the boiler 10 and scrubber 12 may be omitted and the exhaust gas from pyroscrubber 8 may pass directly to stack 14. In such event normal flue draught in the stack may be employed to draw gases through the pyroscrubber and draught control by means of dampers or extra air inlets may be exercised close to the bottom of the stack as described in the following description.

Figure 5:
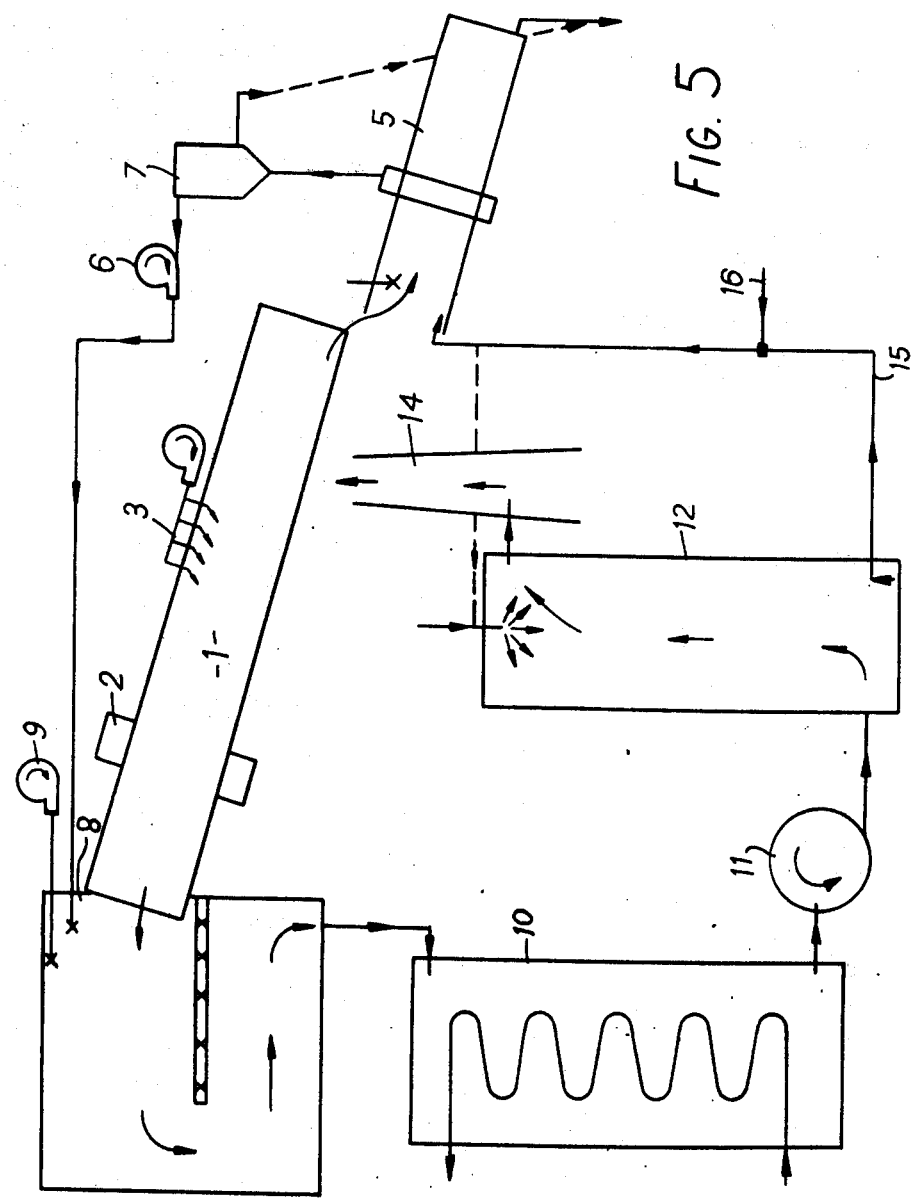
FIG. 5 shows in diagrammatic form a complete unit for the calcination of coke, including ancillary apparatus for controlling and reducing the emission of dust and ash particles.

FIG. 1 shows a longitudinal section of the pyroscrubber 8 of FIG. 5. The pyroscrubber is essentially a combustion chamber, having a lining 20, formed in a conventional manner of refractory blocks connected to a supporting framework composed of vertical steel members 21 and horizontal members 22 and 23. It will be seen that the cross members 23 support both a floor 24 and a ceiling arch 25 (both of which form part of lining 20).

The lining 20 thus defines a combustion chamber in the pyroscrubber having an upper passage 26 and a lower passage 27, separated from each other by the part of the lining supported by cross members 23. The opening 28 between passages 26 and 27 may be slightly restricted, but the abrupt change of direction in the fast moving gases leads to a substantial degree of slip between the entrained particles and the gas and promotes turbulence in the gas itself.

Air may be injected at high velocity at a controlled pressure into the gases entering through inlet 29 via circular manifold 30 having ten circumferentially spaced conduits 31 opening into the chamber at an angle to its axis at small ports immediately downstream of the inlet. For an inlet 29 of about 390 cms diameter, it has been found that ten ports of about 20 cms diameter allow sufficient air to be injected to the chamber to secure very thorough mixing with the gases. The air pressure in the manifold 30 can be varied to regulate the air input and thus the combustion temperature. Air to be injected into the combustion chamber via air manifold 30 may conveniently be introduced into the manifold through air channels arranged between steel cross members 23, since this arrangement leads to some desirable preheating of the air and corresponding cooling of the steel members.

A further gas inlet manifold 32 is provided for the water vapour/air mixture from the cooler. This is provided with conduits leading to port orifices 33. The ports 31 and 33 are most preferably distributed along the first 4–5 meters of passage 26.

Figure 2:
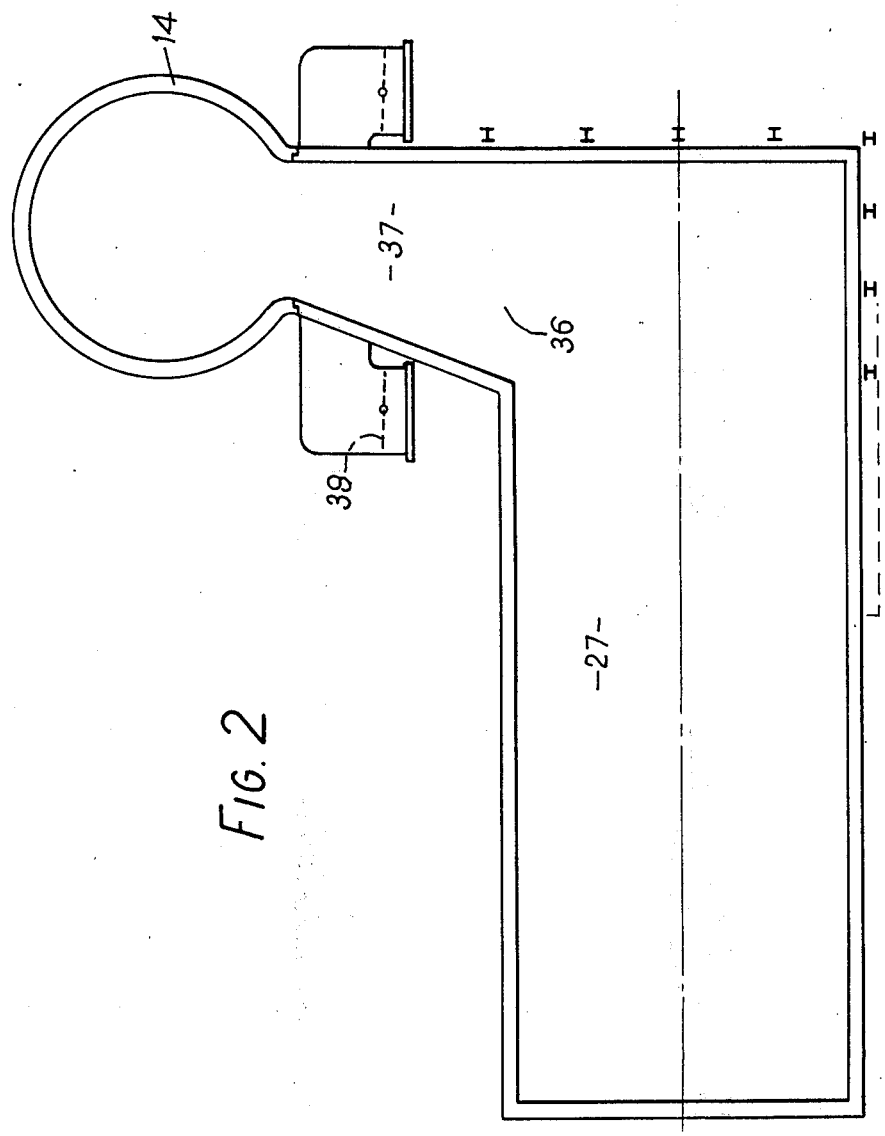
FIG. 2 is a sectional plan view of the line 2—2 of FIG. 1.
Figure 3:
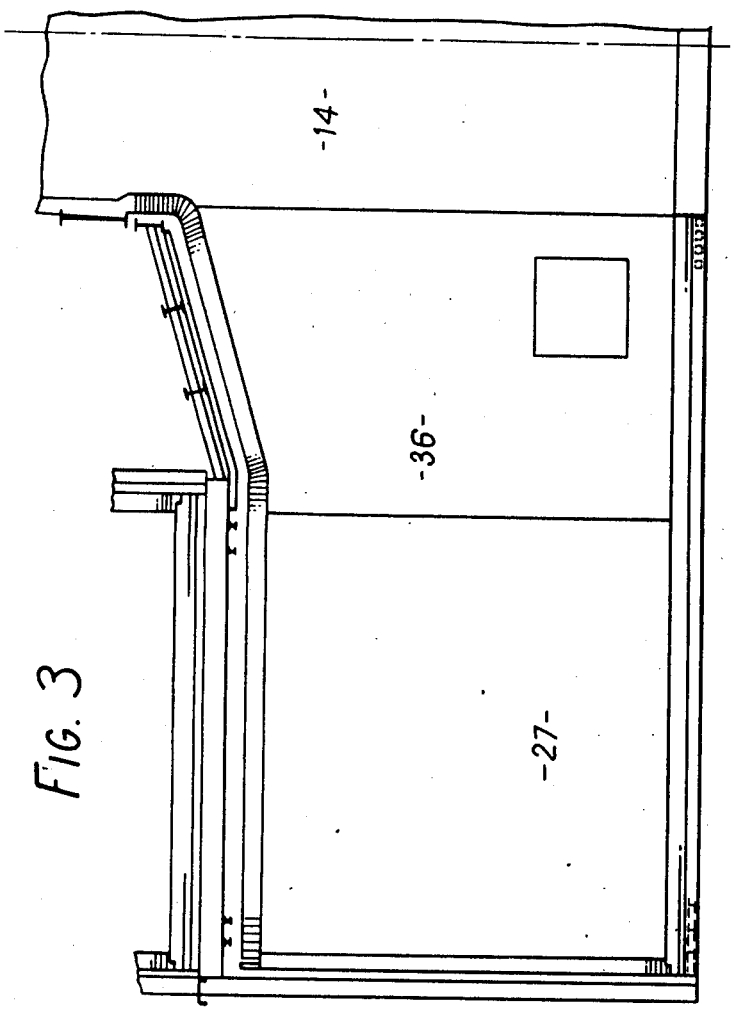
FIG. 3 is a section on the line 3—3 of FIG. 1.
Figure 4:
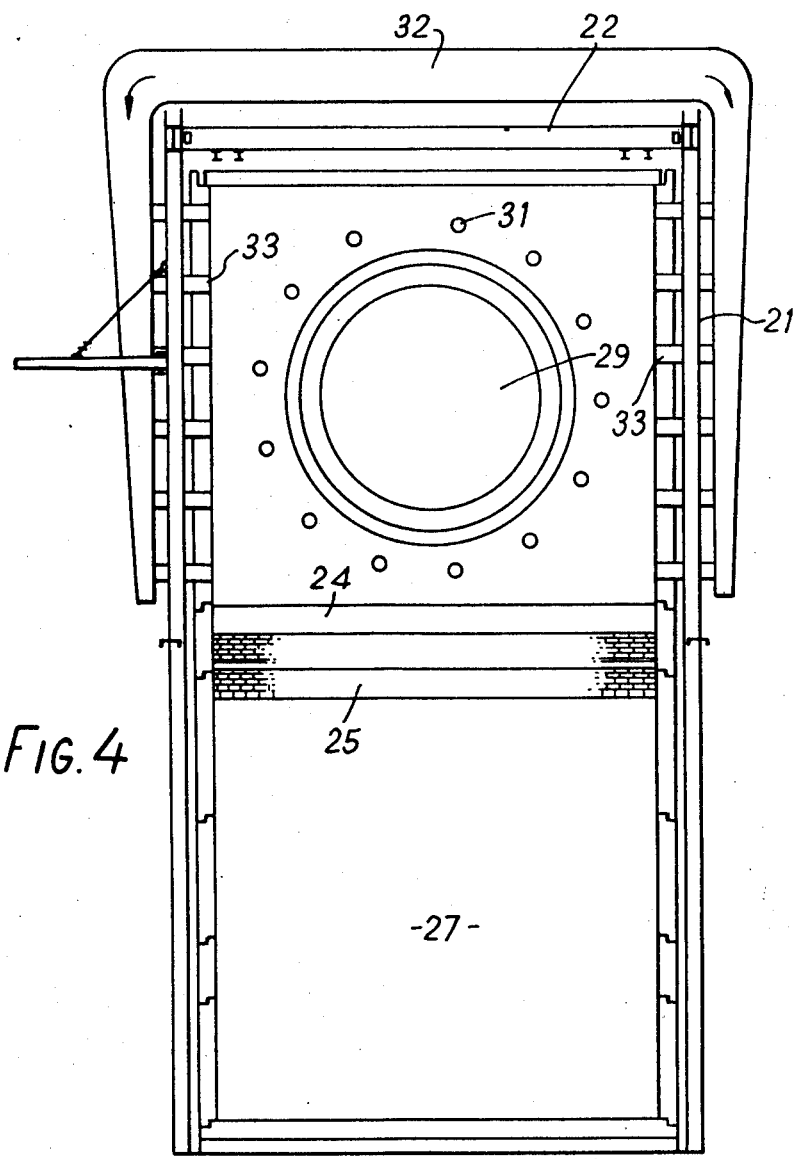
FIG. 4 is a section on the line 4—4 of FIG. 1.

As shown in FIGS. 2 and 3, the lower passage 27 has an outlet 36 leading to stack 14 via a tapering breach passage 37. Air can be bled into the breach passage via adjustable dampers 38. Alternatively or additionally mechanical dampers may be incorporated in the breach passage to regulate the flue draught.

One or more gas or oil burners such as 34 are provided adjacent the inlet 29, to be used at least for initially igniting the gaseous intake mixed with the air from inlets 31. In most instances combustion of the dust-laden gases will be self-sustaining, in which case the burners will only be used at start-up.

The construction has various access doors 35 to passages 26 and 27 for cleaning and maintenance purposes.

The apparatus of the invention allows effectively double combustion residence time within a chamber of a given length due to the U-shaped arrangement of the combustion chamber. In addition, the good mixing of gas and air immediately after intake ensures that combustion begins as early as possible during gas travel through the chamber, and shortens the length of residence required for complete combustion.

The extended residence time allows any particularly large dust particles to settle should they fail to burn properly during entrainment in the gas, while resultant fly ash tends to settle in the chamber rather than pass through the outlet.

In use, it may be preferred to inject a total amount of air via port orifices 31 and 33 at the inlet end of the chamber in excess of that required to complete the combustion of the solids and any volatiles, in order to provide some excess oxygen and to simultaneously obtain the correct temperature to effect rapid combustion of the entrained coke particles. The air supply can be varied to control the temperature within the chamber, that is, to keep it as high as is allowable having regard to the chamber materials and construction. The air injection speed will generally be about twice the gas inlet speed to cause thorough mixing and turbulence at the entry to the combustion chamber.

When the apparatus of the invention is applied to scrub exhaust gases from coke calcining or carbonising kilns, it is preferred that a maximum temperature of between 1090° and 1375° C be employed. Suitably the temperature will rise from about 1000° C at the inlet to 1250° C at the outlet or breach to the stack, with a suitable gas velocity of 15 meters/second in the stack. At such temperatures complete combustion of 1 mm particles of carbonaceous dust can be expected in not more than 3 to 5 seconds, the exact time taken depending on slip and the excess of air over that actually required for combustion. Between 50% and 100% excess air is advantageously used, while if possible a slip of at least 1.5 meters/second should be attained at some point in the chamber.

If the pyroscrubber is associated with a kiln which carbonises or calcines about 20 to 25 tons of coke per hour, then about 60 to 100 tons per hour of air will be required to provide such an excess amount of air over that required for complete combustion.

When the apparatus of the invention is applied to pyroscrubbing the exhaust from coke calcining or carbonising kilns, the hydrocarbon volatiles will usually render the process self-sustaining, depending upon their proportions in the exhaust gas. Supplementary gas or oil burners will generally be provided but if the process is self-sustaining they will only be needed at start-up to raise the temperature to such a level that the process can continue on its own.

If the apparatus is operated with a chamber temperature of about 1100° – 1325° C to burn dust and volatiles from a coke calcining kiln, it is expected that substantially complete combustion of solids will be achieved, leaving only the non-combustible mineral content as fly ash, while the CO content in the resultant exhaust may be reduced to about 0.1 p.p.m. if the exhaust gas is cooled to about 1000° C.

We claim:

1. A pyroscrubber device for removal and combustion of coarse, dense coke particles entrained in a stream of waste gas from a coke calcining furnace, comprising:
   a. structure, including wall members, defining
      i. an elongated, U-shaped refractory-lined combustion chamber comprising a substantially rectangular upper passage and a substantially rectangular lower passage disposed under said upper passage,
      ii. a relatively large waste gas inlet disposed at one end of said upper passage for directing a stream of waste gas from the coke calcining furnace substantially along the center of the upper passage,
      iii. a plurality of relatively small air inlet orifices arranged symmetrically about said waste gas inlet for directing jets of air obliquely toward the center of said upper passage to effect thorough mixing of air with the waste gas in a zone of the upper passage near the waste gas inlet and to propel the waste gas along the upper passage,
      iv. a gas outlet in a vertical side wall and close to the end of the lower passage proximate to said one end of said upper passage,
      v. a stack for discharge of waste gas to atmosphere,
      vi. structure defining a passage for conducting waste gas from said gas outlet to said stack, and
      vii. gas flow control means in said passage for controlling flue draught in said stack;
   b. means for supplying air under pressure to said air inlet orifices; and
   c. means for receiving waste gas from the coke calcining furnace and introducing the waste gas into said waste gas inlet;
   d. said upper passage communicating with said lower passage at the end of said upper passage opposite to said waste gas inlet for causing gas passing from the upper passage to the lower passage to undergo reversal in flow direction and consequent slip of entrained solid, dense coke particles in relation to the admixed air to accelerate combustion of the particles; and
   e. said upper and lower passages presenting a substantially unrestricted path for flow of waste gas therethrough and said gas undergoing a further substantial change in flow direction in passing from said lower passage to said outlet to promote further slip of said particles.

2. A device as defined in claim 1, wherein said structure further defines a plurality of second air inlet orifices longitudinally spaced from said first-mentioned air inlet orifices in said upper passage in the direction of gas flow; and further including means for supplying air to said second air inlet orifices independently of the supply of air to said first-mentioned orifices.

3. A device as defined in claim 1, wherein said structure includes a floor of said upper passage and a roof of said lower passage disposed in closely proximate spaced relation to said floor.

4. Apparatus for calcining coke comprising a rotary furnace, inclined to the horizontal, having a coke inlet at its upper end and a coke discharge at its lower end, means for establishing a stream of hot gas within said furnace, said gas exhausting from the upper end thereof, structure including wall members defining a stationary elongated combustion chamber separate from said rotary furnace for receiving gas exhausted from said furnace and for burning combustible material contained in said gas during passage therethrough, heat exchange means connected to receive the waste gas issuing from said stationary combustion chamber, stack means connected to receive the cooled waste gas from said heat exchanger for discharge to atmosphere, a rotary coke cooler for receiving coke discharged from said rotary furnace, means for introducing coolant at one end of said cooler, means for extracting vapours intermediate the ends of said rotary cooler and means for forwarding extracted vapours to said combustion chamber for combustion of the combustible content thereof; said combustion chamber comprising an elongated U-shaped refractory-lined structure having a substantially rectangular upper passage and a substantially rectangular lower passage, disposed beneath and communicating with one end of said upper passage, and including a furnace gas inlet at the opposite end of said upper passage, means for injecting air in close proximity to said furnace gas inlet, means for injecting said extracted gas vapours into said combustion chamber in close proximity to the location of air entry and means for withdrawing the gas stream laterally from said lower passage at the end remote from the communication with said upper passage.

* * * * *